(12) United States Patent
    Chan

(10) Patent No.: US 11,479,341 B2
(45) Date of Patent: Oct. 25, 2022

(54) PROPELLER DRIVING UNIT

(71) Applicant: XDynamics Limited, Hong Kong (HK)

(72) Inventor: Man Wah Chan, Mid-Levels (HK)

(73) Assignee: XDYNAMICS LIMITED, Hong Kong (HK)

( * ) Notice: Subject to any disclaimer, the term of this patent is extended or adjusted under 35 U.S.C. 154(b) by 117 days.

(21) Appl. No.: 16/492,315

(22) PCT Filed: Mar. 26, 2018

(86) PCT No.: PCT/CN2018/080494
§ 371 (c)(1),
(2) Date: Sep. 9, 2019

(87) PCT Pub. No.: WO2019/183757
PCT Pub. Date: Oct. 3, 2019

(65) Prior Publication Data
US 2021/0331783 A1    Oct. 28, 2021

(51) Int. Cl.
*B64C 11/48*    (2006.01)
*B64D 27/24*    (2006.01)
*B64C 39/02*    (2006.01)
*H02P 5/74*     (2006.01)

(52) U.S. Cl.
CPC ............ *B64C 11/48* (2013.01); *B64C 39/024* (2013.01); *B64D 27/24* (2013.01); *H02P 5/74* (2013.01); *B64C 2201/042* (2013.01)

(58) Field of Classification Search
CPC ................................ B64D 11/48; B64D 27/24
See application file for complete search history.

(56) References Cited

U.S. PATENT DOCUMENTS

2017/0283042 A1* 10/2017 Gamble .................. B64C 11/28
2018/0044029 A1*  2/2018 Koegler ................... B64F 5/10

FOREIGN PATENT DOCUMENTS

| CN | 101652286 A | * | 2/2010 | ........... B64C 39/024 |
| CN | 105539830 A | * | 5/2016 | ............. B64C 13/50 |
| CN | 106347651 A | * | 1/2017 | ........... B64C 27/022 |

* cited by examiner

*Primary Examiner* — Timothy D Collins
*Assistant Examiner* — Justin Michael Heston

(57) ABSTRACT

A propeller driving unit for an unmanned aerial vehicle (UAV). The propeller driving unit comprises a motor unit comprising a first motor module and a second motor module, with the first motor module being adapted to independently drive a first propeller or a first set of propellers, the second motor module being adapted to independently drive a second propeller or a second set of propellers; wherein the first and second motor modules are coaxially arranged within the motor unit. The invention also relates to an unmanned aerial vehicle comprising the described propeller driving unit.

17 Claims, 6 Drawing Sheets

PROPELLER DRIVING UNIT

FIELD OF THE INVENTION

The invention relates to a driving unit for driving one or more parts of an unmanned aerial vehicle (UAV), and particularly, but not exclusively, to a propeller driving unit for use in an unmanned aerial vehicle (UAV).

BACKGROUND OF THE INVENTION

There has been a rapid development in the field of unmanned vehicles and particularly, in the technology of unmanned aerial vehicles (UAVs) such as multi-copters and drones. A conventional UAV may comprise one or more propellers outwardly extended from its main body to facilitate the flight. Each propeller or set of propellers may typically comprise two or more propeller blades, with the propeller and thus the blades being driven by a motor into rotation to generate the lift and the thrust required for flying the UAV. Features and configurations of the propeller and the motor are thus critical in the design of a UAV and play an important role in flight stability and control.

One known problem associated with conventional UAVs is that they are often bulky and relatively heavy, and thus are not so convenient to be carried around by the user and to store. Particularly, the extended arrangement of the one or more propellers from the main body of the UAV renders further difficulties for the handling and the storage of the UAV, which is undesirable.

OBJECTS OF THE INVENTION

An object of the present invention is to provide a novel propeller driving unit or motor unit for an unmanned aerial vehicle such as a drone or a multi-copter.

Another object of the present invention is to mitigate or obviate to some degree one or more problems associated with known propeller driving units or motor units of unmanned aerial vehicles, or at least to provide a useful alternative.

The above objects are met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a propeller driving unit for an unmanned aerial vehicle (UAV). The propeller driving unit comprises a motor unit having a first motor module and a second motor module, with the first motor module being adapted to independently drive a first propeller or a first set of propellers, and the second motor module being adapted to independently drive a second propeller or a second set of propellers; wherein the first and second motor modules are coaxially arranged within the motor unit.

In a second main aspect, the invention provides an unmanned aerial vehicle (UAV) comprising the propeller driving unit according to the first main aspect.

In a third main aspect, the invention provides a motor unit for driving propellers of an unmanned aerial vehicle (UAV). The motor unit comprises a first motor module arranged coaxially with a second motor module along a common shaft assembly; wherein the first motor module is adapted to independently rotate a first propeller or a first set of propellers and the second motor module is adapted to independently rotate a second propeller or a second set of propellers in counter directions via the common shaft assembly.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention relates to a driving unit for driving parts of an unmanned vehicle such as, but not limited to, one or more propellers of an unmanned aerial vehicle (UAV) which can be a multi-copter or a drone. In general, a propeller of an UAV may comprise a plurality of blades, such as but not limited to, two, three, four or six radially extending blades or sets of blades connected at a common center. Each of the blades is preferred to be arranged or configured in a specific shape and/or orientation, and more particularly, pitched at a certain angle such that, upon rotation when driven by a motor of the propeller driving unit, the blades are allowed to interact with the incoming air flow to thereby provide the required lift and thrust for flying the UAV.

Figure 1:
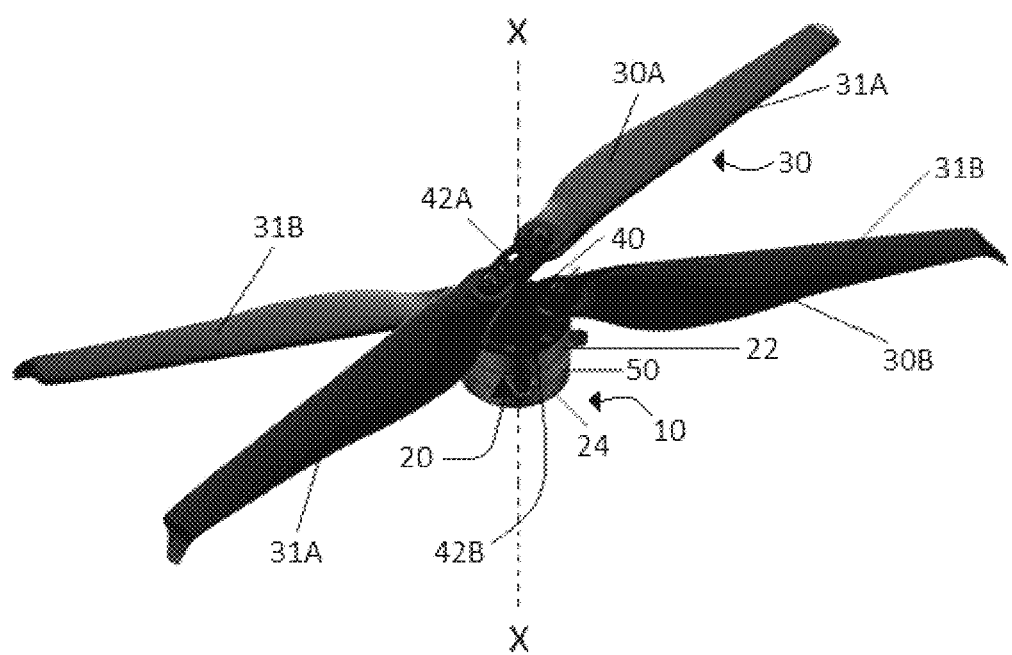
FIG. 1 is a perspective view showing a propeller driving unit in accordance with an embodiment of the present invention.

Referring to FIG. 1, shown is an embodiment of a propeller driving unit 10 for use in an UAV such as a drone. The propeller driving unit 10 may comprise a plurality of propellers or sets of propellers 30, for example, two sets of propellers 30A and 30B as shown in the figure. The propellers 30 are arranged to connect with and are driven by a motor unit 20 for rotation via a common shaft assembly 40. In this embodiment, each set of propellers 30A or 30B comprises two radially and oppposingly arranged blades 31A or 31B, with the blades 31A or 31B being mounted at the common shaft assembly 40 via one or more respective support members or mounting means 42A and 42B. For example, the support member or mounting means 42A and 42B may comprise one or more sets of upper and lower plates adapted to securely hold or to clamp the respective blades 31A and 31B in place. Alternatively, the support members or mounting means 42A and 42B can be configured such that the blades 31A and 31B are releasably connectable and detachable from the shaft assembly 40 to thereby allow a more compact configuration of propeller driving unit 10. The compact design of the propeller driving unit 10 thus enables the drone to be formed with a smaller size and a lighter weight, which facilitates easy handling and/or storage of the drone by the user.

Particularly, the motor unit 20 of the propeller driving unit 10 may comprise a first motor module 22 and a second motor module 24, with the first motor module being adapted to independently drive the first propeller or a first set of propellers 30B, and the second motor module 24 being adapted to independently drive a second propeller or a second set of propellers 30A. The independent operation of the two motor modules 22, 24 enables the first and second sets of propellers 30B, 30A to be independently driven and controlled, with the operation of one motor module not being interfered with or affected by the operation of the other motor module. For example, the first and second motor modules 22, 24 can be arranged to rotate in counter directions or in the same direction, and/or to rotate at different speeds or at the same speed. One of the two motor modules 22, 24 may also be selectively switched on to allow rotation of only one set of the propellers 30B, 30A, for example. Despite the independent operation, however, the first motor module 22 and the second motor module 24 are coaxially arranged and connected within the motor unit 20, such that the motor unit 20 comprises one discrete unit at the drone. In one embodiment, the motor unit 20 with the two motor modules 22, 24 can be housed by a motor casing (not shown), with the shaft assembly 40 extending therefrom to connect the two sets of propellers 30 with the respective motor modules 22, 24, for example.

Figure 2:
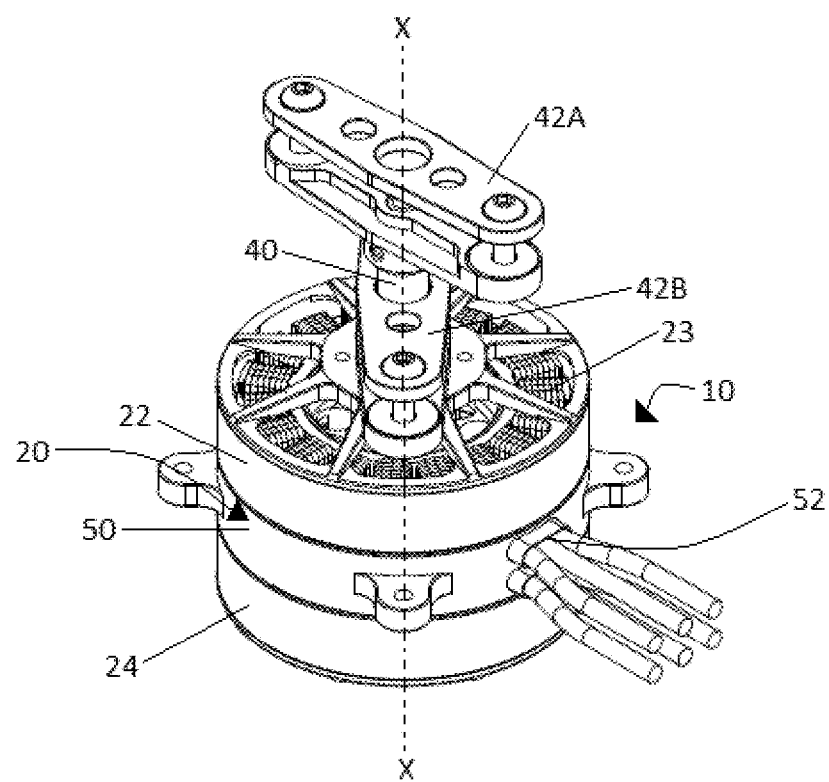
FIG. 2 is another perspective view of the propeller driving unit of FIG. 1 with the propeller blades removed.
Figure 3:
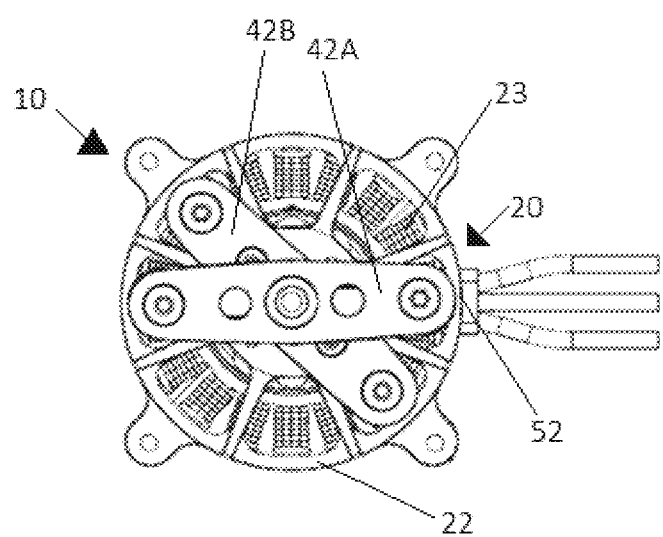
FIG. 3 shows a top view of the propeller driving unit of FIG. 2.
Figure 4:
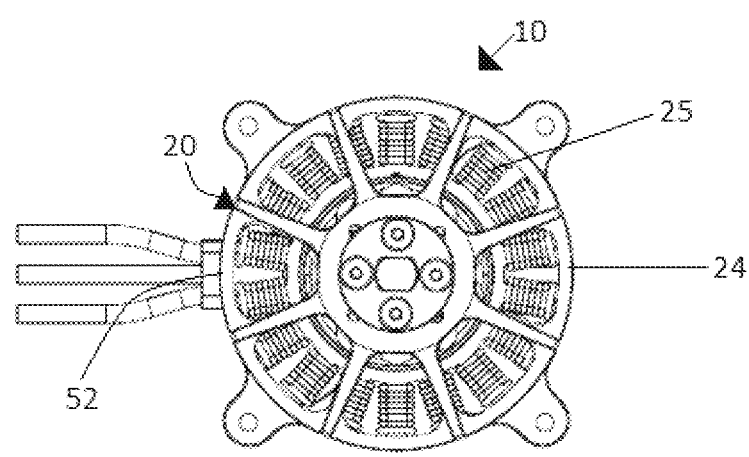
FIG. 4 shows a bottom view of the propeller driving unit of FIG. 2.
Figure 5:
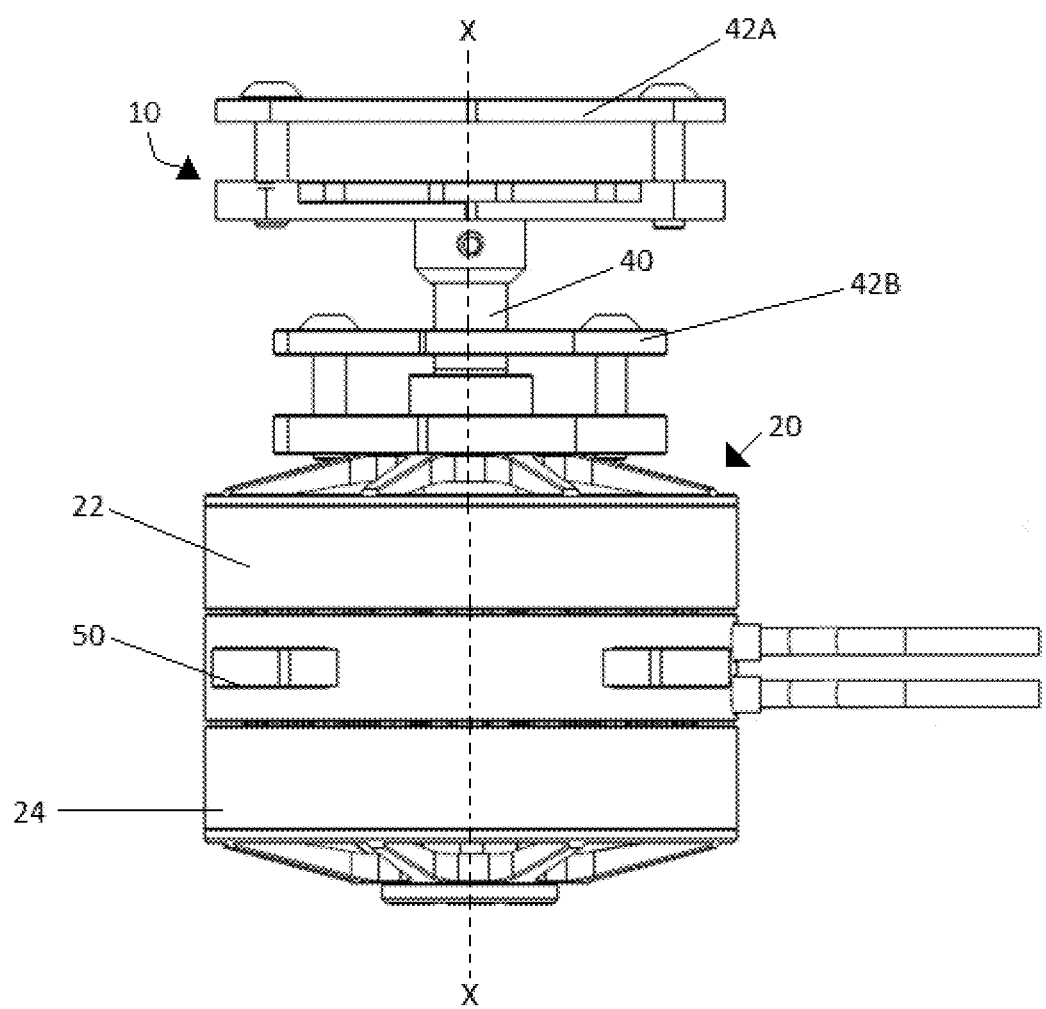
FIG. 5 shows a side view of the propeller driving unit of FIG. 2.

In the embodiment as shown in FIG. 1, the first propeller or first set of propellers 30B can be arranged coaxially with the second propeller or second set of propellers 30A on a same side of the motor unit 20. Particularly, the two sets of propellers 30A, 30B can be arranged to substantially overlap with each other via a common centre of rotation, with the common centre being substantially aligned with the longitudinal axis of the motor unit 20 and the axis of the common shaft assembly 40, see the axis X-X as shown in FIGS. 1 and 2, for example.

FIGS. 2 to 6 show a number of further different views of the propeller driving unit 10, of which the blades 31A or 31B of the propellers 30A, 30B are removed to thereby allow the motor unit 20 and its relevant parts be more clearly revealed. In this embodiment, the motor unit 20 of the propeller driving unit 10 may further comprise a motor module support body 50 preferably arranged between the coaxially located first and second motor modules 22, 24. As shown in the cross-sectional view of FIG. 6, the motor module support body 50 (see FIG. 5) can be configured such that stator coils 28 of the first motor module 22 can be provided or mounted on a first side S1 of the motor module support body 50, and stator coils 29 of the second motor module 24 can be provided or mounted on an opposing second side S2 of the motor module support body 50. Rotor coils or rotor magnets 23 of the first motor module 22 can be rotatably provided or mounted on the first side S1 of the motor module support body 50, and rotor coils or rotor magnets 25 of the second motor module 24 can be rotatably provided or mounted on the opposing second side S2 of the motor module support body 50. The use of a common motor module support body 50 for supporting the stator coils 28, 29 of the first and the second motor modules 22, 24 at two opposing sides of the support body 50 in the motor unit 20 is particularly beneficial in allowing a compact configuration of the motor unit 20, and that the two independent motor modules 22, 24 can then be effectively combined to work as a single motor unit 20. Such an arrangement significantly reduces the overall size and weight of the motor unit 20, and particularly, reduces the distance between the lowermost motor module and the uppermost set of propellers and thus the overall height of the drone. It also requires only one connection point for connecting the motor unit 20 to the drone.

In one embodiment, the motor module support body 50 may comprise an external wall or casing at which one or more openings 52 can be provided for receiving one or more power cables for connecting the motor modules 22, 24 with one or more external power sources, i.e. power sources external to the motor unit 20.

Figure 6:
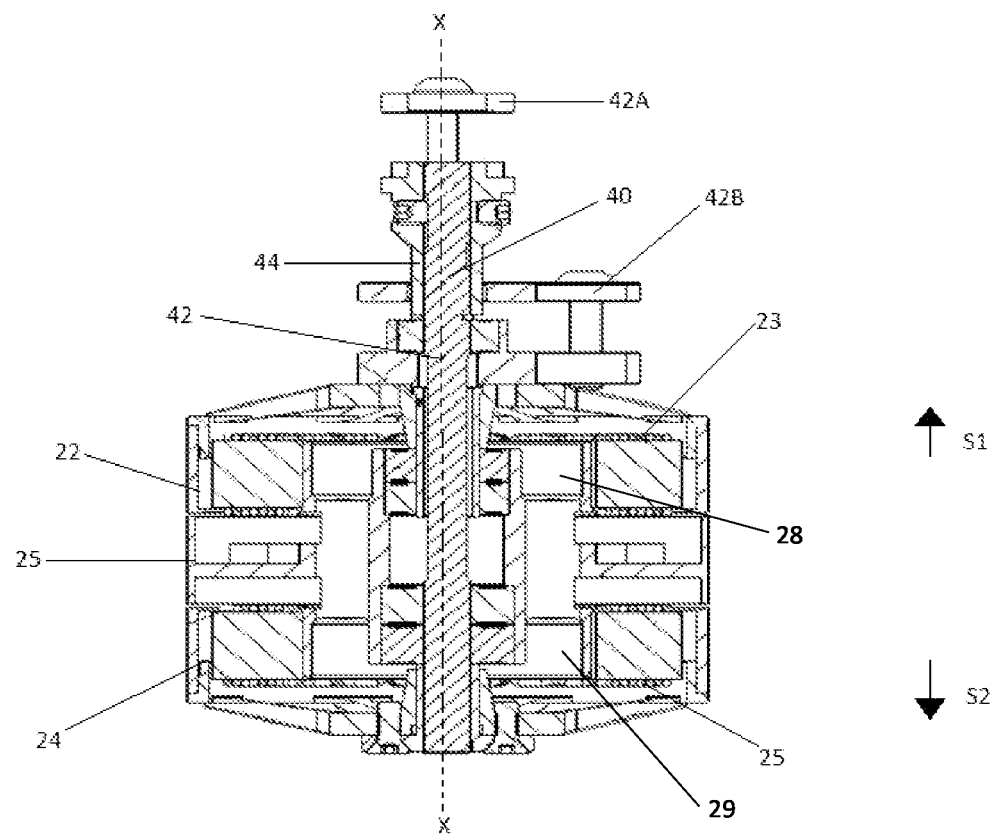
FIG. 6 shows a side cross-sectional view of the propeller driving unit of FIG. 5.

As described above, the first motor module 22 and the second motor module 24 are coaxially arranged along and are connected via the centrally located, common shaft assembly 40. Particularly, the shaft assembly 40 is adapted to rotatably connect the first motor module 22 to the first propeller or first set of propellers 30B, and to rotatably connect the second motor module 24 to the second propeller or second set of propellers 30A. Such an arrangement can be achieved by having the common shaft assembly 40 comprise a first shaft 42 rotatably connected to the second propeller or second set of propellers 30A, and a second shaft 44 rotatably connected to the first propeller or first set of propellers 30B. In one embodiment, the first shaft 42 can be provided co-axially with the second shaft 44 to allow each shaft to rotate independently, for example, by having the first shaft 42 comprise a main, core shaft 42 and the second shaft 44 comprise an outer shaft 44 in the form of, for example, a sleeve arranged co-axially and sleevably receiving the main shaft 42, as shown in FIG. 6. Such an arrangement allows the two sets of propellers 30A, 30B to be connected to the two respective motor units 24, 22 via one common shaft assembly 40, but yet are each capable of operating independently, such as to rotate in counter directions, i.e. counter-rotate.

As shown in the embodiment of FIG. 6, the first motor module 22 can be provided on an upper side, i.e. S1, of the motor module support body 50 relative to the first propeller or first set of propellers 30B and the second propeller or second set of propellers 30A; and the second motor module 24 can be provided on a lower side, i.e. S2, of the motor module support body 50 relative to the first propeller or first set of propellers 30B and the second propeller or second set of propellers 30A. In this embodiment, the first shaft 42 can be arranged to extend from the lower side of the motor module support body 50 to the second propeller or second set of propellers 30A, which is mounted above the first propeller or first set of propellers 30B relative to the motor unit 20. The second shaft 44 can also be arranged to extend from the upper side of the motor module support body 50 to the first propeller or first set of propellers 30B, which are mounted below the second propeller or second set of propellers 30A relative to the motor unit 20.

In one further embodiment, it is preferred that the first propeller or first set of propellers 30B is arranged close to but not touching the second propeller or second set of propellers 30A. The short spacing distance between the two sets of propellers 30A, 30B may again be attributed to the use of the common motor support body 50 between the two motor modules 22, 24, which allows the distance between the upper set of propellers 30B and its driving motor module 24, i.e. the lower motor module, to be as short as possible. The short distance is beneficial in reducing the overall height of the resulting drone and, particularly, minimising vibrations during operation of the propeller driving unit 10 and thus, reducing noises and enhancing stability of the flight. The short separating distance between the two sets of propellers also assists in avoiding and/or minimising the formation of interfering air flow by the propeller counterparts, which may affect or deteriorate flight performance of the drone.

In a further aspect of the present invention, there is provided an unmanned aerial vehicle (UAV) such as a drone including the propeller driving unit 10 and thus the motor unit 20 as described above.

The present invention also relates to a propeller driving unit 10 for used in an unmanned aerial vehicle (UAV) such as a drone. The propeller driving unit 10 may comprise a motor unit 20 having a first motor module 22 and a second motor module 24 coaxially arranged within the motor unit 20, such as those as described above. The two motor modules 22, 24 are adapted to independently drive a first propeller or a first set of propellers 30B and a second propeller or a second set of propellers 30A, respectively, such that the first and the second propellers or set of propellers 30B, 30A can be rotated in counter directions to each other. The motor unit 20 may further comprise a common motor module support body 50 which is shared by both the first and the second motor modules 22, 24, and more specifically, is adapted to support both the stator coils 28, 29 of the first and the second motor modules 22, 24 within the motor unit 20 to thereby form a single operating motor unit 20 with multiple, independently functioning motor modules. This is particularly advantageous in allowing the two motor modules 22, 24 to effectively operate as a single motor unit 20 which significantly reduces the size and weight of the overall motor unit and thus the resulting drone. The compact arrangement of the propeller driving unit 10 also enables the two sets of propellers 30A, 30B to be spaced at a minimal distance which is beneficial in reducing vibrations caused by the rotating motors for the respective propellers and thus reducing noise, and minimising formation of interfering air flows by the propeller counterparts and thus improving stability and efficiency of the flight.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art is referred to herein, such prior art does not constitute an admission that the prior art forms a part of the common general knowledge in the art.

The invention claimed is:

1. A propeller driving unit for an unmanned aerial vehicle (UAV), comprising:
    a motor unit comprising a first motor module and a second motor module, the first motor module being adapted to independently drive a first propeller or a first set of propellers, the second motor module being adapted to independently drive a second propeller or a second set of propellers; the first and second motor modules being coaxially arranged within the motor unit; the first propeller or first set of propellers is arranged coaxially with the second propeller or second set of propellers on a same side of the motor unit;
    wherein the motor unit comprises a motor module support body arranged between the coaxially located first and second motor modules, with the first motor module being mounted on an upper face of a first side of the motor module support body relative to the first propeller or first set of propellers and the second propeller or second set of propellers; and the second motor module being mounted on a lower face of an opposing second side of the motor module support body relative to the first propeller or first set of propellers and the second propeller or second set of propellers; wherein stator coils of the first motor module are mounted on said upper face of the first side of the motor module support body and stator coils of the second motor module are mounted on said lower face of the opposing second side of the motor module support body; and wherein rotor coils or rotor magnets of the first motor module are rotatably mounted on said upper face of the first side of the motor module support body, and rotor coils or rotor magnets of the second motor module are rotatably mounted on said lower face of the opposing second side of the motor module support body such that the first motor module, the second motor module and the motor module support body are effectively combined to work as a single motor unit.

2. The propeller driving unit according to claim 1, wherein the first propeller or first set of propellers is adapted to rotate in a counter direction to that of the second propeller or second set of propellers.

3. The propeller driving unit according to claim 1, wherein the motor unit comprises a common shaft assembly rotatably connecting the first motor module to the first propeller or first set of propellers and rotatably connecting the second motor module to the second propeller or second set of propellers.

4. The propeller driving unit according to claim 3, wherein the common shaft assembly comprises a first shaft rotatably connected to the second propeller or second set of propellers, and a second shaft rotatably connected to the first propeller or second set of propellers; wherein the first shaft is arranged co-axially with the second shaft to allow each shaft to rotate independently.

5. The propeller driving unit according to claim 4, wherein the first shaft comprises a main shaft and the second shaft comprises an outer shaft having a sleeve arranged co-axially with the main shaft.

6. The propeller driving unit according to claim 4, wherein the first shaft is extending from a lower side of the motor module support body to the second propeller or second set of propellers which is mounted above the first propeller or first set of propellers relative to the motor unit.

7. The propeller driving unit according to claim 4, wherein the second shaft is extending from an upper side of the motor module support body to the first propeller or first set of propellers which are mounted below the second propeller or second set of propellers relative to the motor unit.

8. The propeller driving unit according to claim 3, further comprising at least two support members each adapted to support respective one of the first propeller or first set of propellers and the second propeller or second set of propellers at the common shaft assembly.

9. The propeller driving unit according to claim 3, wherein the first propeller or first set of propellers and the second propeller or second set of propellers are releasably connectable with the common shaft assembly.

10. The propeller driving unit according to claim 1, wherein the first and second motor modules are adapted to rotate independently in a same direction or counter directions relative to one another; and/or to rotate independently at a same speed or at different speeds relative to one another.

11. The propeller driving unit according to claim 1, wherein the first propeller or first set of propellers is arranged to be coaxially aligned yet separate from the second propeller or the second set of propellers.

12. The propeller driving unit according to claim 1, wherein the first propeller or first set of propellers and the second propeller or second set of propellers are arranged to substantially overlap with each other.

13. An unmanned aerial vehicle (UAV) comprising the propeller driving unit according to claim 1.

14. A motor unit for driving propellers of an unmanned aerial vehicle (UAV), comprising:
a first motor module arranged coaxially with a second motor module along a common shaft assembly; wherein the first motor module is adapted to independently rotate a first propeller or a first set of propellers, and the second motor module is adapted to independently rotate a second propeller or a second set of propellers in counter directions via the common shaft assembly; wherein the first propeller or first set of propellers is arranged coaxially with the second propeller or second set of propellers on a same side of the first motor module and the second motor module;
a motor module support body arranged between the coaxially located first and second motor modules, with the first motor module being mounted on an upper face of a first side of the motor module support body relative to the first propeller or first set of propellers and the second propeller or second set of propellers, and the second motor module being mounted on a lower face of an opposing second side of the motor module support body relative to the first propeller or first set of propellers and the second propeller or second set of propellers; wherein stator coils of the first motor module are mounted on said upper face of the first side of the motor module support body and stator coils of the second motor module are mounted on said lower face of the opposing second side of the motor module support body; and wherein rotor coils or rotor magnets of the first motor module are rotatably mounted on said upper face of the first side of the motor module support body, and rotor coils or rotor magnets of the second motor module are rotatably mounted on said lower face of the opposing second side of the motor module support body such that the first motor module, the second motor module and the motor module support body are effectively combined to work as a single motor unit.

15. The motor unit according to claim 14, wherein the common shaft assembly comprises a first shaft rotatably connected to the second propeller or second set of propellers, and a second shaft rotatably connected to the first propeller or first set of propellers wherein the first shaft is arranged co-axially with the second shaft to allow each shaft to rotate independently.

16. The motor unit according to claim 15, wherein the first shaft comprises a main shaft and the second shaft comprises an outer shaft having a sleeve arranged co-axially with the main shaft.

17. The motor unit according to claim 15, wherein the first shaft extending from a lower side of the motor module support body to the second propeller or second set of propellers which is mounted above the first propeller or first set of propellers relative to the motor unit and wherein the second shaft extends from an upper side of the motor module support body to the first propeller or first set of propellers which are mounted below the second propeller or second set of propellers relative to the motor unit.

* * * * *